United States Patent [19]

Frost et al.

[11] 3,996,520

[45] Dec. 7, 1976

[54] INTERFERENCE REJECTING LOGARITHMIC RECEIVER

[75] Inventors: William F. Frost, Stewart Manor; Philip Kassel, Sea Cliff, both of N.Y.; Charles M. Clothier, deceased, late of Farmingdale, N.Y., by Agnes Clothier, administratrix

[73] Assignee: Sperry Rand Corporation, New York, N.Y.

[22] Filed: Mar. 30, 1962

[21] Appl. No.: 205,475

[52] U.S. Cl. .............................. 325/324; 325/475; 343/17.1 R
[51] Int. Cl.² ............................................. H04B 1/10
[58] Field of Search ............... 325/475, 474, 324; 343/17.1, 11, 17.1 R; 328/117, 145

[56] References Cited

UNITED STATES PATENTS

| | | | |
|---|---|---|---|
| 2,262,978 | 12/1953 | Sunstein | 328/145 |
| 2,398,490 | 4/1946 | Atwood | 325/324 |
| 2,825,900 | 3/1958 | Collbohm | 343/100.12 |
| 3,089,136 | 5/1963 | Albersheim | 343/11 X |

FOREIGN PATENTS OR APPLICATIONS 720,345  12/1954  United Kingdom .............. 343/17.1

*Primary Examiner*—Howard A. Birmiel
*Attorney, Agent, or Firm*—Howard P. Terry

EXEMPLARY CLAIM

1. A pulsed signal receiver comprising
   a pair of antennas having non-identical radiation characteristics for receiving desired pulsed signals and interfering signals of higher duty cycle than said desired signals,
   a pair of logarithmic receiver channels respectively coupled to said antennas,
   means coupled to said channels for differentially combining the outputs thereof,
   and a fast time constant circuit coupled to the output of said differentially combining means, said circuit being adapted to transmit said desired signals and to reject all other signals having a duty cycle higher than that of said desired signals.

4 Claims, 2 Drawing Figures

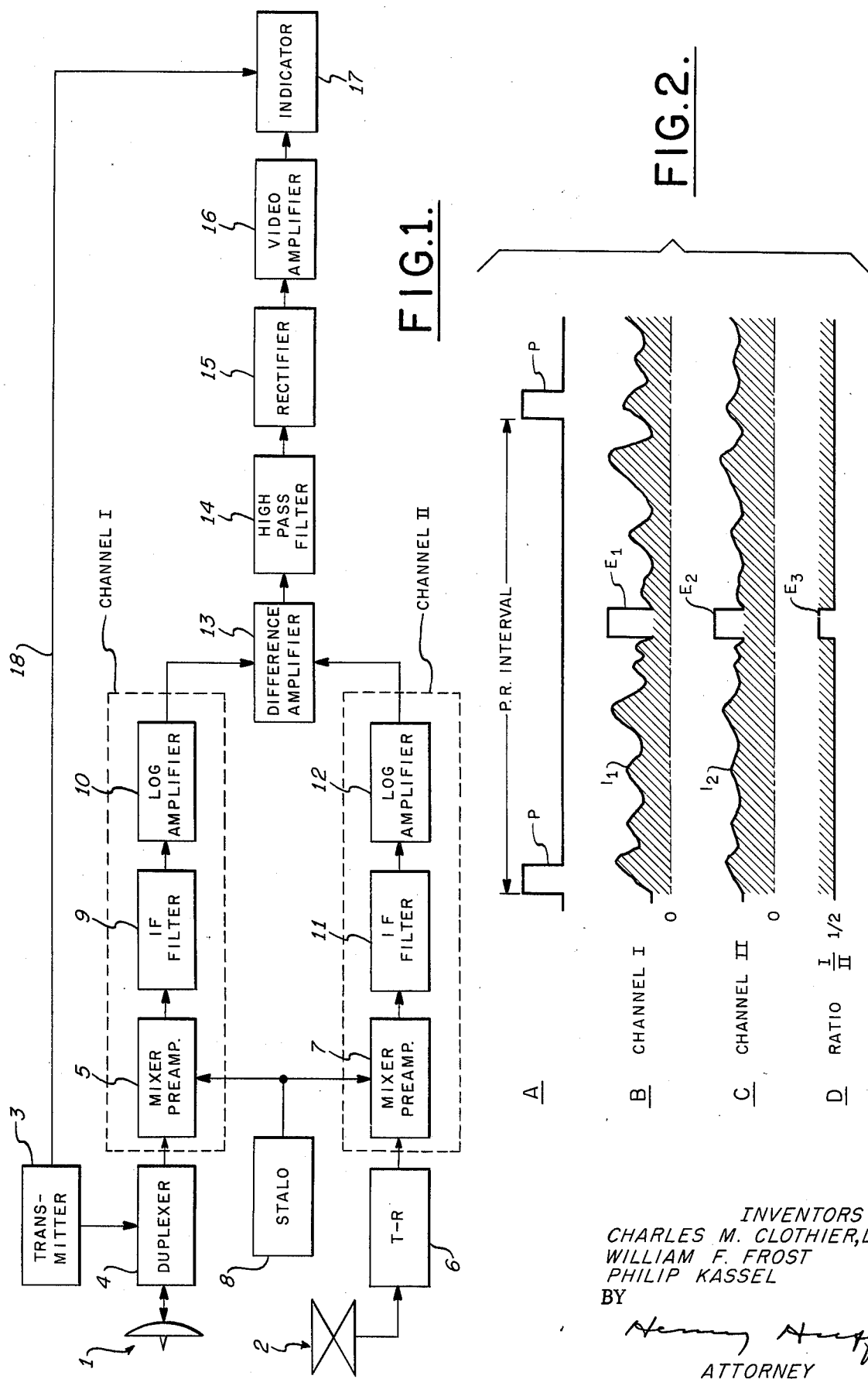

INTERFERENCE REJECTING LOGARITHMIC RECEIVER

The invention herein described was made in the course of or under a contract or subcontract thereunder, with the Department of the Navy.

The present invention generally relates to pulsed signal receivers and, more particularly, to a pulsed signal receiver of the logarithmic type adapted for the rejection of interfering signals of high duty cycles relative to the duty cycle of the desired pulsed signals.

Amplitude responsive pulsed signal receivers such as, for example, many conventional radar receivers, are particularly susceptible to varying amplitude continuous wave interfering signals at substantially the same carrier frequency as that of the desired pulsed signals. For purposes of the present invention, "continuous wave" interfering signals include not only continuous signals but also interfering signals having duty cycles (ratio of On period to Off period) which are high relative to the duty cycle of the desired pulsed signals. As is well known, conventional filters do not discriminate satisfactorily between a desired pulse signal and a noice-like continuous wave inerfering signal at substantially the same carrier frequency. In accordance with the present invention, however, a high degree of discrimination is achieved through the use of a pair of logarithmic receiving channels, signal amplitude comparison and high pass filtering circuits.

It is an object of the present invention to provide signal receiver means for discriminating between desired pulsed signals and interfering signals having high duty cycles relative to that of said desired signals.

Another object is to provide dual channel receiving apparatus for discriminating between a desired pulsed signal and a continuous wave interfering signal of substantially the same carrier frequency.

An additional object is to provide a dual channel radar receiver of the logarithmic type adapted for discriminating between a desired pulsed signal and interfering signals, of substantially the same carrier frequency on the basis of their relative duty cycles.

A further object is to provide a dual channel radar receiver of the logarithmic type for selectively responding to pulsed target signals to the exclusion of varying amplitude continuous wave interfering signals of substantially the same carrier frequency.

These and other objects of the present invention, as will appear from a reading of the following specification, are achieved in an illustrative pulse radar receiver embodiment by the provision of dual receiving channels, each having a receiving antenna of nonidentical radiation characteristics. Each receiver channel further includes logarithmic means for amplifying its respectively received signal. The outputs of the two logarithmic amplifiers are differentially combined and then applied to a fast time constant circuit adapted to transmit the relatively short target echo pulses and to reject all other (interfering) signals having a duty cycle higher than that of said desired signals.

In general, due to the different radiation characteristics (such as pattern, shape or polarization) of the two receiving antenna, the desired pulsed signal energy and the interfering signal energy will split between the two receiving channels in different ratios. That is, the ratio between the amplitudes of the desired signal in the two receiving channels will be different than the ratio between the amplitudes of the interfering signals in said channels. Thus, a first signal ratio obtains during the occurrence of only the interfering signals whereas a second and different signal ratio will exist during the occurrence of the desired pulsed signal whether or not the interfering signal is also present at that time and irrespective of any amplitude variations of the interfering signals. In a typical case where the interfering signal is essentially continuous and the desired signal is of a relatively brief duration, the first ratio will persist for a time much longer than the second ratio.

The instantaneous ratios between the signals appearing in the two receiving channels is continuously determined by means of the logarithmic amplifiers in each of the channels and a difference circuit for differentially combining the outputs of the logarithmic amplifiers. The difference circuit produces an output signal having an intantaneous amplitude representing the instantaneous amplitude ratio of the signals in the two receiver channels. In the event that the ratio between the desired pulsed signals in the two receiver channels is different than the ratio between the interfering signals in the two channels, a short pulse having a duration commensurate with that of the desired signals is produced in the output of the combining circuit. The output pulse occurs simultaneously with the desired pulsed signal and is applied to a fast time constant circuit which passes said pulse and rejects more slowly varying signals.

For a more complete understanding of the present invention reference should be had to the following specification and to the appending figures of which:

FIG. 1 is a block diagram of an illustrative radar embodiment of the present invention; and FIG. 2 is a series of idealized wave forms useful in explaining the operation of the apparatus of FIG. 1.

Referring to FIG. 1, the numerals 1 and 2 generally designate respective antennas having nonidentical radiation characteristics. In the illustrative embodiment, antenna 1 is directional and antenna 2 is omnidirectional in radiation characteristic. Alternatively, both antennas may be directional but oriented along different lines of sight or they may have similar directivity but different polarization sensitivity. For example, antenna 1 may be designed to respond primarily to vertically polarized signals, while antenna 2 is adapted for responding primarily to horizontally polarized signals. In general, it is sufficient for purposes of the present invention that the two antennas have radiation characteristics which differ from each other in some aspect.

Pulsed signals are generated by transmitter 3 and applied to antenna 1 via duplexer 4. Echo pulses returned by reflecting target are received jointly by antennas 1 and 2. The echo signals received by antenna 1 are applied by duplexer 4 to a first input of mixer-preamplifier 5. Similarly, the echo signals received by antenna 2 are applied by T-R device 6 to a first input of mixer-preamplifier 7. The stabilized local oscillator signal generated by STALO 8 is jointly applied to the second inputs of mixer-preamplifiers 5 and 7.

It is convenient to consider circuits 5 and 7 as comprising the inputs to respective signal channels I and II. Chanel I further includes IF bandpass filter 9 and logarithmic amplifier 10. Channel II further comprises IF bandpass filter 11 and logarithmic amplifier 12. The echo signals from channels I and II, i.e., from the outputs of logarithmic amplifiers 10 and 12, are applied to and differentially combined within difference amplifier 13.

As is well understood, a radar receiver logarithmic amplifier has a gain characteristic such that its response varies as the logarithm of the applied input signal. More particularly, the logarithmic amplifier receives an intermediate frequency echo signal and produces a video frequency output signal having an amplitude representing the logarithm of the amplitude of the input intermediate frequency signal. The principles of a typical radar receiver logarithmic amplifier are briefly discussed on pages 553–554 of Radar System Engineering, Volume I, Radiation Laboratory Series, McGraw Hill, 1947.

Difference amplifier 13 produces an output video signal having an amplitude representing the difference in amplitudes between the signals at the outputs of logarithmic amplifiers 10 and 12. In so doing, amplifier 13 produces an output signal related to the ratio between the amplitudes of the signals at the respective inputs of amplifiers 10 and 12. This follows from the fact that a ratio or quotient may be obtained by the well-known technique of subtracting the logarithm of the divisor from the logarithm of the dividend.

For the sake of illustration, it is assumed that antennas 1 and 2 receive target-reflected echo signals as well as interfering signals propagating in a direction different than the direction of the echo signals. Due to the differing directivities of antennas 1 and 2, the target echo signal energy and the interfering signal energy will split between receiving channels I and II in different ratios. It is further assumed that the echo and interfering signals have substantially the same carrier frequency but that the interfering signals are substantially continuous as compared to the relatively low duty cycle of the echo signals. Such a situation is contemplated in the idealized waveforms of FIG. 2.

Wave form A of FIG. 2 represents two successive pulsed radar transmissions P issuing from antenna 1. The target echo signal $E_1$, which is received in channel I is shown in wave form B. Similarly, the target echo signal $E_2$ which is received in channel II is depicted in wave form C. The asumed direction to the target relative to the directivity axis of antenna 1 is such that the echo signal amplitude at the input of channel I is approximately twice the amplitude of the echo signal at the input of channel II.

Wave forms B and C further depict amplitude modulated continuous wave interfering signals as received in channels I and II from a source located in a direction different than the direction along which the echo signal pulses are received. In the illustrative case, the direction of the interfering signal source is such that the amplitude of the interfering signal $I_2$ at the input of channel II is approximately twice the amplitude of the interfering signal 1 at the input of channel I. In other words, the target is situated near the directivity axis of antenna 1 whereas the interfering signal source is located along a line further removed from said directivity axis.

The echo signals and interfering signals received by channels I and II are logarithmically amplified and differentially combined to produce wave form D at the output of difference amplifier 13. The instantaneous amplitude of wave form D is related to the intantaneous ratio of the amplitude of the channel I input signal to the amplitude of the channel II input signal. By inspection of wave form D, it can be seen that said ratio is ½ during the occurrence of the interfering signal only and that the ratio is unity during the simultaneous occurrence of the echo and interfering signals, whereby the pulse $E_3$ is produced at the output of amplifier 13. Pulse $E_3$ occurs simultaneously with the desired echo signal and has a duration commensurate therewith.

The signal represented by wave form D is applied to the input of a fast time contant or high pass filter circuit 14. Filter 14 may be of the type shown in FIG. 12.14 of the aforementioned Radiation Laboratory Series book and is designed to pass the pulse $E_3$ (having a low duty cycle) and to block and reject the essentially direct current component represented by the cross-hatched portion of wave form D, said portion having a relatively high duty cycle. Thus, the distinguishable signal $E_3$ representing the target is produced at the output of filter 14 to the substantial exclusion of the interfering signal despite the identity of the target and interfering signal carrier frequencies and despite the amplitude variations of the interfering signal. Comparable discrimination is also achieved when the interfering signal is unmodulated or when it is of the character of noise generated externally of the radar system.

It should be noted that the echo signal amplitude may be greater in channel II than in channel I, depending upon the direction of the target relative to the directivity axis of antenna 1. So long as the echo signal and interfering signal ratios between the channels are different, however, the receiving system still discriminates between the echo an interfering signals in the manner described. The only variation is that the polarity of the echo pulse passed by filter 14 may be inverted relative to the pulse $E_3$.

In certain applications, it may be desirable to accept only the echo signals in the main directive lobe of antenna 1. This is desirable, for example, in radar tracking systems. When the echo signal is received in said main lobe, the amplitude of the signal in channel I always will exceed that in channel II. Otherwise, if the echo signal is received in a minor lobe of antenna 1, the echo signal amplitude in channel II will exceed that in channel I. By rectifying the output echo signal of filter 14, it is possible to accept only the main lobe echo signals received by antenna 1. Rectifier 15 is provided for such a purpose and is poled to pass only the positive going echo pulses such as pulse $E_3$. Alternatively, it might be advantageous to accept echo signals irrespective of the lobe of antenna 1 in which it is received. In the latter case, rectifier 15 would be a full wave rectifier so as to produce output pulses of the same polarity irrespective of the polarity of the pulses passed by high pass filter 14.

The echo signal at the output of rectifier 15 is applied to a signal utilization device such as a cathode ray tube target indicator. In the illustrative embodiment, this is accomplished by applying the rectified target signals via video amplifier 16 to target indicator 17. Indicator 17 may be for example, a type A indicator which receives a sweep synchronizing trigger for the transmitter 3 via line 18.

From the preceding specification, it will be seen that the objects of the present invention have been achieved through the use of a pair of logarithmic receiving channels whose outputs are differentially combined and processed by a fast time constant circuit to yield target echo pulses to the exclusion of interfering signals at the same carrier frequency but of higher duty cycle than the target pulses. The pulses and interfering signals are received by two antennas respectively coupled to the two receiving channels. The radiation characteristics of the two antennas are nonidentical in order that the echo pulses and interfering signals divide between the two receiving channels in different ratios. So long as different ratios are obtained in the two receiving channels, a high order of dicrimination can be achieved in favor of the echo pulses and against the interfering signals.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A pulsed signal receiver comprising
   a pair of antennas having non-identical radiation characteristics for receiving desired pulsed signals and interfering signals of higher duty cycle than said desired signals,
   a pair of logarithmic receiver channels respectively coupled to said antennas,
   means coupled to said channels for differentially combining the outputs thereof,
   and a fast time constant circuit coupled to the output of said differentially combining means, said circuit being adapted to transmit said desired signals and to reject all other signals having a duty cycle higher than that of said desired signals.

2. A pulse radar receiver comprising
   a pair of antennas of non-identical radiation characteristics for receiving desired echo pulses and interfering signals of higher duty cycle than said desired echo pulses,
   a pair of logarithmic receiver channels respectively coupled to said antennas,
   means coupled to said channels for differentially combining the outputs thereof,
   and a high pass filter coupled to the output of said differentially combining means, said filter being adapted to transmit said desired echo pulses and to reject all other signals having a duty cycle higher than that of said desired echo pulses.

3. A pulse radar receiver for discriminating in favor of desired echo pulses to the substantial exclusion of interfering signals of higher duty cycle than said desired echo pulses,
   said receiver comprising a pair of antennas having non-identical radiation characteristics,
   a pair of logarithmic receiver channels respectively coupled to said antennas,
   means coupled to said channels for differentially combining the outputs thereof,
   a fast time constant circuit coupled to the output of said differentially combining means, said circuit being adapted to transmit said desired echo pulses and to reject all other signals having a duty cycle higher than that of said desired echo pulses
   and a rectifier coupled to the output of said fast time constant circuit.

4. A pulse radar receiver for discriminating in favor of desired echo pulses to the substantial exclusion of interfering signals of higher duty cycle than said desired echo pulses,
   said receiver comprising a pair or antennas of non-identical radiation characteristics,
   a pair of receiver channels each including a logarithmic amplifier respectively coupled to said antennas,
   a difference amplifier coupled to the outputs of said logarithmic amplifiers,
   a high pass filter coupled to the output of said difference amplifier, said filter being adapted to transmit said desired echo pulses and to reject all other signals having a duty cycle higher than that of said desired echo pulses
   and a rectifier coupled to the output of said high pass filter.

* * * * *